(12) United States Patent
Onizuka

(10) Patent No.: US 8,770,851 B2
(45) Date of Patent: Jul. 8, 2014

(54) WHEEL ROLLING BEARING APPARATUS

(75) Inventor: Takaaki Onizuka, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 283 days.

(21) Appl. No.: 12/998,609

(22) PCT Filed: Nov. 30, 2009

(86) PCT No.: PCT/JP2009/070119
§ 371 (c)(1),
(2), (4) Date: May 6, 2011

(87) PCT Pub. No.: WO2010/061949
PCT Pub. Date: Jun. 3, 2010

(65) Prior Publication Data
US 2011/0211784 A1 Sep. 1, 2011

(30) Foreign Application Priority Data

Nov. 28, 2008 (JP) ................ P2008-304612
Nov. 24, 2009 (JP) ................ P2009-266632

(51) Int. Cl.
*F16C 13/00* (2006.01)
(52) U.S. Cl.
USPC ....................................... 384/544
(58) Field of Classification Search
USPC ......... 384/543, 544, 546, 547, 584, 586, 588, 384/589; 301/105.1
See application file for complete search history.

(56) References Cited

U.S. PATENT DOCUMENTS

| | | | | |
|---|---|---|---|---|
| 2,272,118 A | * | 2/1942 | Imse et al. | 384/206 |
| 3,724,907 A | * | 4/1973 | Housel | 301/105.1 |
| 4,408,809 A | * | 10/1983 | Walter et al. | 384/486 |
| 4,749,288 A | * | 6/1988 | Tilch et al. | 384/584 |
| 5,011,233 A | * | 4/1991 | Nomura et al. | 301/108.1 |
| 6,126,322 A | | 10/2000 | Otsuki et al. | |
| 6,217,220 B1 | * | 4/2001 | Ohkuma et al. | 384/489 |
| 6,224,266 B1 | | 5/2001 | Ohtsuki et al. | |
| 2006/0133708 A1 | * | 6/2006 | Meeker et al. | 384/544 |
| 2009/0256550 A1 | * | 10/2009 | Ono et al. | 384/448 |
| 2010/0046876 A1 | * | 2/2010 | Murakami et al. | 384/544 |

FOREIGN PATENT DOCUMENTS

| | | |
|---|---|---|
| JP | 4-1721 | 1/1992 |
| JP | 7-54658 Y2 | 12/1995 |
| JP | 11-303861 A | 11/1999 |

(Continued)

OTHER PUBLICATIONS

Chinese Office Action dated Feb. 1, 2013, with English translation.

*Primary Examiner* — James Pilkington
(74) *Attorney, Agent, or Firm* — McGinn IP Law Group, PLLC

(57) ABSTRACT

To provide a wheel rolling bearing apparatus which can reinforce a proximal end portion of a first flange portion of an outer race member effectively. A first flange portion (21) is provided on an upper portion side of an outer circumference of an outer race member (11). A first reinforcement portion (26) is provided which connects a proximal end portion (21b) of the first flange portion (21) with the outer circumferential surface (11c) of the outer race member (11). The first flange portion (21) is reinforced by the first reinforcement portion (26) by connecting the proximal end portion of the first flange portion (21) with the outer circumferential surface (11c) by a convexly curved surface.

8 Claims, 9 Drawing Sheets

(56) References Cited

FOREIGN PATENT DOCUMENTS

| JP | 2000-85306 A | 3/2000 |
| JP | 2000-162222 A | 6/2000 |
| JP | 2004-036818 A | 2/2004 |
| JP | 2006-105304 A | 4/2006 |
| JP | 2007-057014 A | 3/2007 |
| JP | 2008-64130 A | 3/2008 |
| WO | WO2008/053831 | * 5/2008 |

* cited by examiner

WHEEL ROLLING BEARING APPARATUS

TECHNICAL FIELD

The present invention relates to a wheel rolling bearing apparatus for supporting a wheel of a vehicle.

BACKGROUND ART

Normally, a flange portion is projected on a wheel rolling bearing apparatus for supporting a wheel of a motor vehicle for fixedly attaching the rolling bearing apparatus to a suspension system on the vehicle side. This flange portion includes a first flange portion which is projected on an upper side of an outer circumferential surface of an outer race member and a second flange portion which is projected on a lower side thereof, and the first flange portion and the second flange portion each include a plurality of projecting flange portions. A bolt hole is formed in each flange portion so as to extend in an axial direction, and a female thread is formed in an inner circumferential surface of the bolt hole so as to enable a bolt to be screwed into the bolt hole to thereby fasten the flange portion to the suspension system (for example, refer to Patent Document 1).

Since a moment load is applied to the rolling bearing apparatus as the vehicle turns, for example, when the vehicle turns to the right, strong tensile stress is generated in the first flange portions of the rolling bearing apparatus disposed particularly in a left wheel of the vehicle. Because of this, a proximal end portion of a surface of the first flange portion which faces the outside of the vehicle is smoothly connected to the outer circumferential surface of the outer race member by a reinforcement portion so as to restrain the flange portion from being inclined with respect to an axis of the outer race member. An upper surface of the reinforcement portion which connects the flange portion with the outer circumferential surface of the outer race member constitutes an arc-shaped concave curve in an axial section of the outer race member. Namely, the reinforcement portion connects smoothly the flange portion with the outer circumferential surface of the outer race member by an arc-shaped concavely curved surface.

In addition, since compression stress is generated in a proximal end portion of the second flange portion as the vehicle turns, a reinforcement portion is also projected on a proximal end portion of a surface of the second flange portion which faces the outside of the vehicle to thereby connect the proximal end portion with the outer circumferential surface of the outer race member by an arc-shaped concavely curved surface.

The first flange portions and the second flange portions are all formed into the same shape, and the reinforcement portions are all also formed into the same shape.

RELATED ART DOCUMENT

Patent Document

Patent Document 1: JP-A-2000-162222 (FIG. 1)

SUMMARY OF THE INVENTION

Problem that the Invention is to Solve

In the conventional wheel rolling bearing apparatus, a high load is exerted on the proximal end portions of the first flange portions particularly when the vehicle turns, and therefore, it is required to increase the rigidity at the proximal end portions. In order to increase the rigidity of the flange portion, a radius of curvature of the concavely curved surface of the reinforcement portion is increased to some extent to ensure radial and axial thicknesses of the reinforcement portion. However, when the radius of curvature exceeds a predetermined value, it follows that the concavely curved surface is formed as far as the position where the bolt hole is opened.

On the other hand, a surface of the flange portion which faces the inside of the vehicle (a flange surface) is a surface which is brought into abutment with the member on the vehicle side, the surface is worked into a flat plane which intersects an axial direction at right angles. Because of this, in forming the bolt hole, a through hole is formed by a cutting tool such as a drill or an end mill by employing the flange surface as a working reference, and thereafter, a female thread is formed in an inner circumferential surface of the through hole by a tap.

In this way, in forming the bolt hole in the flange portion, the flange surface is employed as the working reference, and therefore, the bolt hole cannot be cut from the flange surface side. Because of this, in the event that the concavely curved surface of the reinforcement portion is formed to the position where the bolt hole is opened, it follows that the cutting work to form the bolt hole is applied to the concavely curved surface. In this case, however, the approach angle of a blade tip of the cutting tool such as the drill and the tap becomes less steep, and therefore, the cutting tool escapes radially outwards of the outer race member to deteriorate workability or the axis of the cutting tool is offset to reduce the accuracy of the bolt hole. Because of this, the radius of curvature of the concavely curved surface of the reinforcement portion cannot be increased to be equal to or larger than the predetermined value, imposing a limit in reinforcing the proximal end portion of the flange portion strongly and rigidly.

The invention has been made in view of these situations, and an object thereof is to provide a wheel rolling bearing apparatus which can reinforce the proximal end portion of the flange portion by the reinforcement portion.

Means for Solving the Problem

According to the invention which attains the object, there is provided a wheel rolling bearing apparatus comprising:

an outer race member which has a first flange portion having a bolt hole and a second flange portion having a bolt hole which are projected on an upper portion side and a lower portion side, respectively, and which is attached to a vehicle side via the first and second flange portions;

an inner race member which is disposed inwards of an inner circumference of the outer race member and to which a wheel is attached; and a plurality of rolling elements which are interposed between the outer race member and the inner race member, characterized in that a first reinforcement portion is projected on at least a proximal end portion of the first flange portion which lie on both sides of the bolt hole to reinforce the proximal end portion by connecting the proximal end portion with an outer circumferential surface of the outer race member, and an upper surface of the first reinforcement portion which connects the proximal end portion of the first flange portion with the outer circumferential surface of the outer race member constitutes a convex curve or a straight line in an axial section thereof.

According to the wheel rolling bearing apparatus configured as described above, the upper surface of the first reinforcement portion constitutes the convex curve or the straight line in the axial section thereof, and therefore, radial and axial thicknesses of the first reinforcement portion can be made thicker than those of the conventional concave curve without forming the first reinforcement portion as far as the position where the bolt is formed. Because of this, the proximal end portion of the flange portion can be reinforced more strongly and rigidly than the conventional apparatus.

In the wheel rolling bearing apparatus, it is preferable that a second reinforcement portion is projected on a proximal end portion of the second flange portion to reinforce the proximal end portion by connecting the proximal end portion with the outer circumferential surface of the outer race member and in that the proximal end portion of the second flange portion and the second reinforcement portion are provided to extend along a full circumferential length of a region where a load is applied to the second flange portion from the rolling elements.

In this case, the proximal end portion of the second flange portion can be reinforced by the second reinforcement portion along the full circumferential length of the region to which the load is applied, and therefore, the proximal end portion can be reinforced effectively.

Advantage of the Invention

Thus, according to the invention, the proximal end portion of the first flange portion can be reinforced strongly and rigidly by the first reinforcement portion, and therefore, the rigidity of the proximal end portion can be increased effectively.

DETAILED DESCRIPTION OF THE INVENTION

Figure 1:
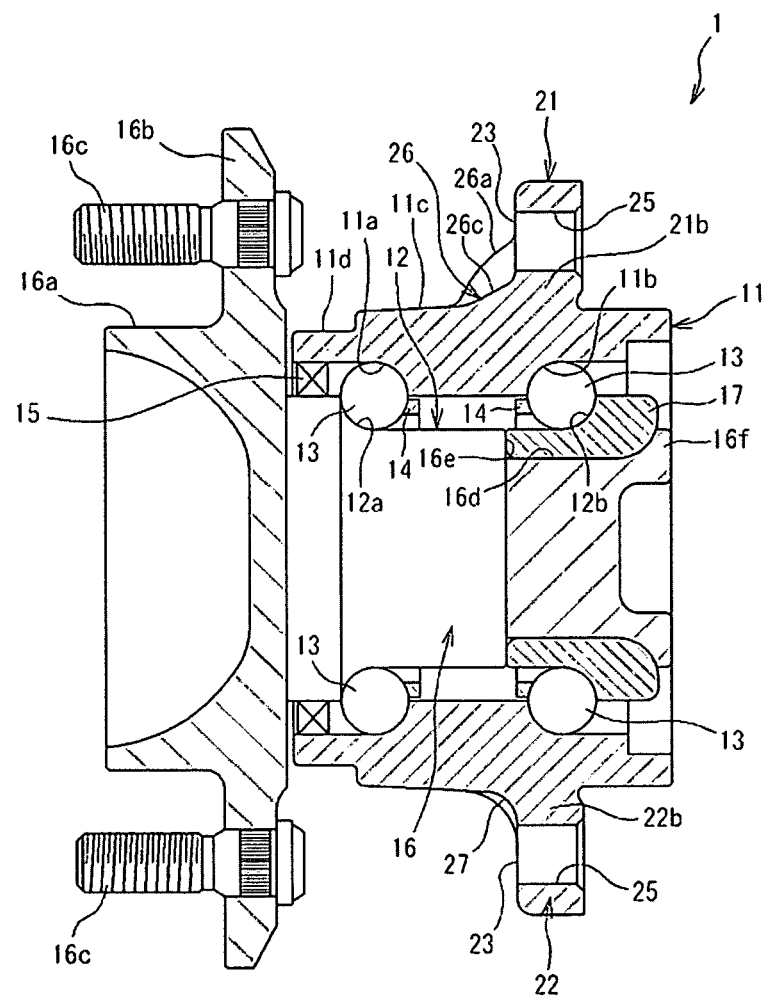
FIG. 1 is a sectional view showing a wheel rolling bearing apparatus according to a first embodiment of the invention.

Next, preferred embodiments of the invention will be described by reference to the accompanying drawings. FIG. 1 is a sectional view showing an embodiment of a wheel rolling bearing apparatus according to the invention. This rolling bearing apparatus 1 is such as to support rotatably a wheel of a vehicle such as a motor vehicle.

The rolling bearing apparatus 1 includes an outer race member 11, an inner race member 12 which is disposed inwards of an inner circumference of the outer race member 11, a plurality of rows of balls 13 which are rollingly interposed between the outer race member 11 and the inner race member 12, cages 14 which retain the plurality of rows of balls 13, respectively, and a seal 15 which is mounted in a gap between the outer race member 11 and the inner race member 12 so as to seal off an interior of the rolling bearing apparatus, and a double row angular contact ball bearing is made up of these constituent members.

The inner race member 12 constitutes an axle to which a wheel, not shown, is attached and is such that a race member 17 is combined with an inner shaft 16. The inner shaft 16 includes a spigot portion 16a to which the wheel is attached and a collar portion 16b which are provided at one end side thereof. A plurality of hub bolts 16c for fixing the wheel are fixed to the collar portion 16b.

A first inner raceway 12a is formed on an outer circumferential surface of the inner shaft 16, and a small-diameter portion 16d, which is smaller in diameter than the first inner raceway 12a, is formed at the other end side thereof The race member 17, which is formed into an annular shape, is press fitted on the small-diameter portion 16d. The race member 17 is press fitted in such a state that one end face thereof is in abutment with a step portion 16e which connects the outer circumferential surface of the inner shaft 16 with the small-diameter portion 16d and is fixed to the inner shaft 16 so as to rotate together therewith by a crimped portion 16f which is formed by crimping a distal end portion of the small-diameter portion 16d radially outwards.

The outer race member 11 has a first outer raceway 11a and a second outer raceway 11b which are formed on an inner circumferential surface thereof so as to face the first inner raceway 12a and the second inner raceway 12b, respectively, and supports rotatably the inner race member 12 via the balls 13.

Figure 2:
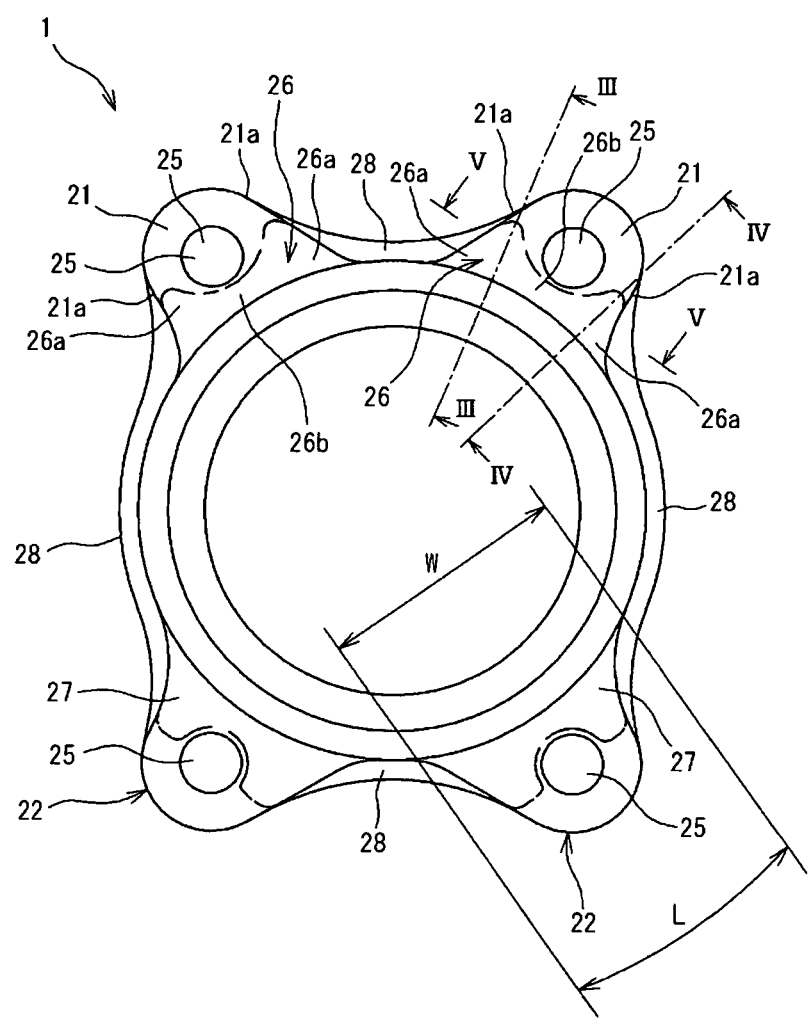
FIG. 2 is a front view showing an outer race member of the rolling bearing apparatus.

Referring FIG. 2, as well, pluralities of first flange portions 21 and second flange portions 22 are provided on an outer circumferential surface of the outer race member 11 along a circumferential direction thereof to project therefrom to attach the outer race member 11 to a suspension system on the vehicle side. In the figure, two first flange portions 21 are projected on an upper portion side of the outer race member 11, and two second flange portions 22 are projected on a lower portion side thereof These flange portions 21, 22 are connected to each other to thereby be reinforced by a collar-shaped circumferential portion 28.

In addition, a bolt hole 25 is formed in each of the flange portions 21, 22 so that an axis of the bolt hole 25 is parallel to an axis of the outer race member 11. A female thread is formed in an inner circumferential surface of the bolt hole 25 to enable a bolt for joining the outer race member 11 to the suspension system on the vehicle side to be screwed into the bolt hole 25.

The outer race member 11 is formed by machining an annular material which is hot forged by use of carbon steel or the like. The flange portions 21, 22 are formed together with the outer race member 11 when it is hot forged. The bolt hole 25 is formed by forming a through hole from an outer surface 23 side which is a side of the individual flange portions 21, 22 which faces the outside (a wheel side) of the vehicle by a drill or an end mill and thereafter forming the female thread in an inner circumferential surface of the through hole formed by a tap.

A first reinforcement portion 26 is provided at a proximal end portion 21b of the first flange portion 21 to project therefrom so as to connect the proximal end portion 21b with an outer circumferential surface 11c of the outer race member 11 to reinforce the proximal end portion 21b. This first reinforcement portion rises from the proximal end portion 21b of the first flange portion 21 towards a left-hand side of the outer race member 11 in an axial direction in FIG. 1, that is, towards a collar portion 16b side of the inner shaft 16. In this embodiment, both side portions of the first reinforcement portion 26 which hold the corresponding bolt hole 25 therebetween rise in a rib-like fashion (refer to FIGS. 2 and 5). These portions which rise in the rib-like fashion (hereinafter, referred to as "rib-like portions") extend towards a distal end side of the first flange portion 21 along circumferential sides 21a of the first flange portion 21. Distal edges of the rib-like portions 26a extend as far as the vicinity of a pitch circle which passes through the center of each bolt hole 25. A boundary between the first reinforcement portion 26 and the first flange portion 21 extends at a radially inner side of a radially inner most part of the bolt hole. In other words, the first reinforcement portion may not extend past the bolt hole.

Figure 5:
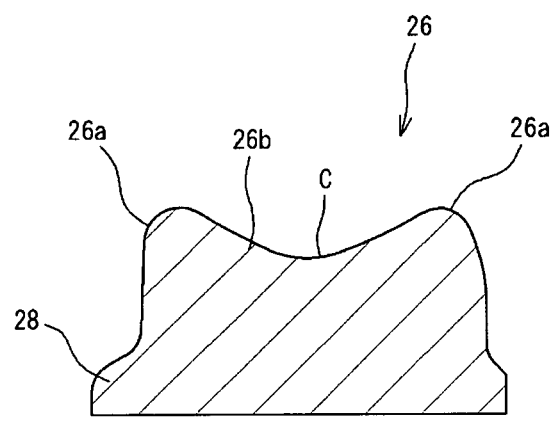
FIG. 5 is a sectional view taken along the line V-V in FIG. 2.

In the first reinforcement portion 26, an inter-rib portion 26b lying between the pair of rib-like portions 26a continues in the form a smooth curved surface, and the rising amount gradually decreases towards a circumferential center C of the portion concerned (refer to FIG. 5). In addition, a distal edge of the inter-rib portion 26b extends as far as the vicinity of the bolt hole 25.

Figure 3:
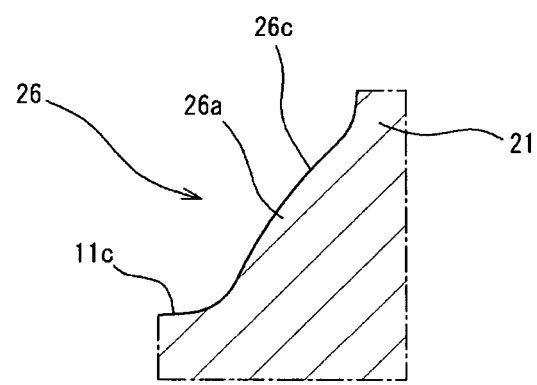
FIG. 3 is a sectional view of a main part taken along the line in FIG. 2.
Figure 4:
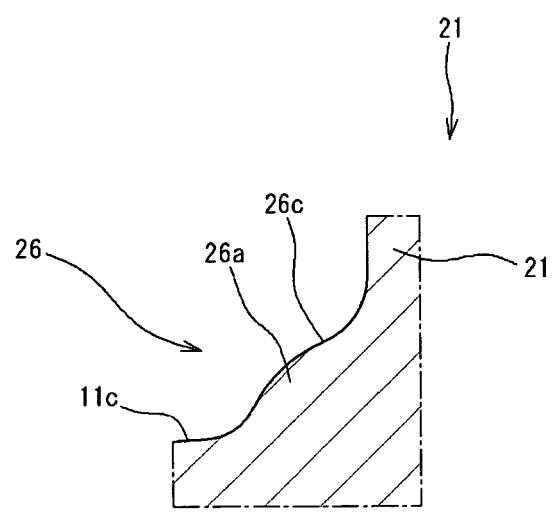
FIG. 4 is a sectional view of the main part taken along the line IV-IV in FIG. 2.

In the first reinforcement portion 26, an upper surface 26c which connects the proximal end portion 21b of the first flange portion 21 and the outer circumferential surface 11c of the outer race member 11 is made up of a convex curve in an axial section of the outer race member 11 (refer to FIGS. 1, 3 and 4). Namely, the first reinforcement portion 26 connects the proximal end portion 21b of the first flange portion 21 with the outer circumferential surface 11c of the outer race member 11 by a convexly curved surface. Additionally, in the inter-rib portion 26b between the pair of rib-like portions 26a, the curvature of the convex curve gradually decreases towards the circumferential center C thereof, and an upper surface of the center C takes a shape close to a straight line in the axial section (refer to FIG. 1). The first reinforcement portion 26 is formed integrally when an annular material for the outer race member 11 is hot forged.

In this way, in the invention, the proximal end portion 21b of the first flange portion 21 and the outer circumferential surface 11c of the outer race member 11 are connected together by the convexly curved surface of the first reinforcement portion 26. Therefore, radial and axial thicknesses of the first reinforcement portion 26 can be made thicker than those of the conventional reinforcement portion in which the portions concerned are connected together by the concavely curved surface without forming the first reinforcement portion 26 as far as the position where the bolt hole 25 is formed. Because of this, the proximal end portion 21b of the first flange portion 21 can be reinforced strongly and rigidly so as to increase the rigidity of the proximal end portion 21b effectively.

On the other hand, the second flange portion 22 projected on the lower portion side of the outer race member 11 is formed so that its width expands gradually from a distal end side towards a proximal end portion 22b (refer to FIG. 2). A circumferential width W of the proximal end portion 22b of the second flange portion 22 is wider than a circumferential width of the proximal end portion 21b of the first flange portion 21. In addition, a second reinforcement portion 27 is projected on the proximal end portion 22b of the second flange portion 22 (refer to FIG. 1) to connect the second flange 22 with the outer circumferential surface 11c of the outer race member 11 to thereby reinforce the proximal end portion 22b of the second flange portion 22.

The second reinforcement portion 27 is such as to connect the second flange portion 22 with the outer circumferential surface 11c of the outer race member 11 by a concavely curved surface. The proximal end portion 22b of the second flange portion 22 and the second reinforcement portion 27 are provided so as to extend a full circumferential length L of a region where a load is applied to the second flange portion 22 by the balls 13. Namely, in such a state that the rolling bearing apparatus 1 shown in FIG. 1 is attached to the left-hand side of a vehicle, for example, when the vehicle turns to the right, a load is applied to the proximal end portion 22 of the second flange portion 22 from the balls 13 to thereby generate therein predetermined compression stress. Therefore, the circumferential width W of the proximal end portion 22b of the second flange portion 22 is expanded so as to match the circumferential range in which the compression stress is generated, and the entirety of the proximal end portion 22b in the circumferential direction and the outer circumferential surface 11c of the outer race member 11 is connected together by the concavely curved surface of the second reinforcement portion 27. In this respect, in the conventional rolling bearing apparatus, the shapes of the first flange portion and the second flange portion are the same, and the circumferential width of the second reinforcement portion is shorter than that of the second reinforcement portion of this patent application. Note that the curvature range of the concavely curved surface of the second reinforcement portion 27 is almost equal in circumferential positions.

In this way, in this embodiment, the proximal end portion 22b of the second flange portion 22 can be reinforced along the full circumferential length L of the region where the load is applied to the second flange portion 22 from the balls 13, and therefore, the proximal end portion 22b can be reinforced effectively.

An absolute value of the stress generated in the proximal end portion 22b of the second flange portion 22 is smaller than an absolute value of the stress generated in the proximal end portion 21b of the first flange portion 21. Therefore, even in the event that the second reinforcement portion 27 is made up of the concavely curved surface, the rigidity of the proximal end portion of the second flange portion 22 can be ensured.

In the embodiment, in order to reduce the weight of he rolling bearing apparatus 1 while ensuring the rigidity of the rolling bearing apparatus 1, a reduced diameter portion 11 is formed on an outer circumferential surface of the first flange portion 21 at a collar portion 16b side end portion thereof (refer to FIG. 1). In addition, in the collar-shaped circumferential edge portion 28 which connects the individual flange portions 20 together, the thickness of portions in a front-to-rear direction of the vehicle (a left-to-right direction in FIG. 2) where high rigidity is not required is made thin to reduce the weight of the rolling bearing apparatus 1 further.

Figure 6:
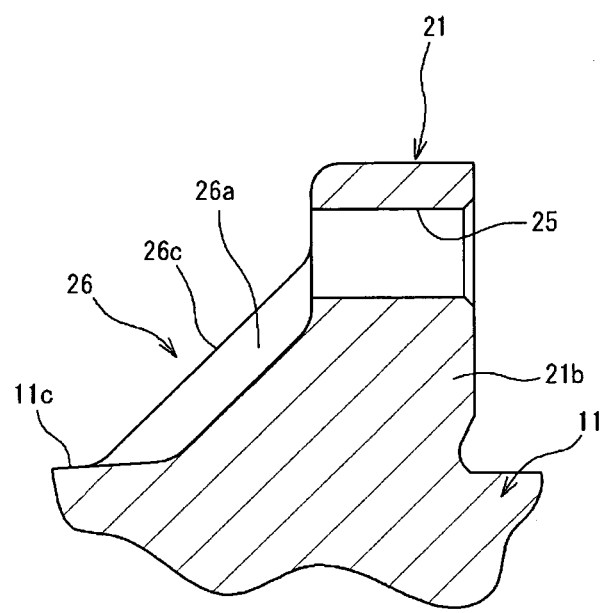
FIG. 6 is a sectional view of a main part of the other embodiment.

FIG. 6 is a sectional view of a main part of a wheel rolling bearing apparatus 1 according to a second embodiment of the invention. This embodiment differs from the embodiment shown in FIG. 1 in that an upper surface 26c of a first reinforcement portion 26 constitutes a straight line, not a projecting curve, in an axial section. Namely, in this embodiment, a sectional shape in the axial direction of the first reinforcement portion 26 is formed into a triangular shape. In this case, too, compared with the conventional rolling bearing apparatus in which the first flange portion 21 and the outer circumferential surface of the outer race member are connected together by the concavely curved surface, the rigidity of a proximal end portion 21b of a first flange portion 21 can be increased more effectively.

The rolling bearing apparatus according to the invention is not limited to the embodiments. For example, as to the upper surface 26c of the first reinforcement portion 26, only the pair of rib-like portions are formed into the convex curve in the axial section, and the inter-rib portion 26b may be formed into a straight line in the axial direction. In addition, the upper surfaces 26c of the pair of rib-like portions 26a may be formed into a straight line in the axial direction, and the upper surface 26c of the inter-rib portion 26a may be formed into a convex curve in the axial direction. In short, in the rolling bearing apparatus 1 according to the invention, the first reinforcement portion 26 may only have to be provided at the portions of the proximal end portion which lie on both the sides thereof which hold the bolt hole therebetween, and the upper surface 26c of the first reinforcement portion 26 may only have to be formed into the convex curve or the straight line in the axial section. Further, in the second reinforcement portion 27, the second flange portion 22 and the outer circumferential surface 11c f the outer race member 11 may be connected together by a convexly curved surface.

Example

To verify the advantage of the invention, an outer race member was prepared as an example in which the first reinforcement portion whose upper surface was made up of the convex curve shown in FIGS. 2 to 4 was formed at a proximal end portion of a first flange portion, and an outer race member was prepared as a comparative example in which the conventional first reinforcement portion whose upper surface was made up of the concave curve was formed in a proximal end portion of a first flange with the other features remaining the same as the example. Then, respective displacements and inclination angles of the outer race members were FEM analyzed when a load of 1.0G was applied to the individual outer race members as a moment load that would be applied to the outer race members when the tire is turned. The results of the FEM analysis of the displacement of the outer race member of the example is shown in FIG. 7, and the results of the FEM analysis of the displacement of the outer race member of the comparative example is shown in FIG. 8. in addition, a ratio of the inclination angle of the comparative example to the inclination angle of the example is shown in FIG. 9.

Figure 7:
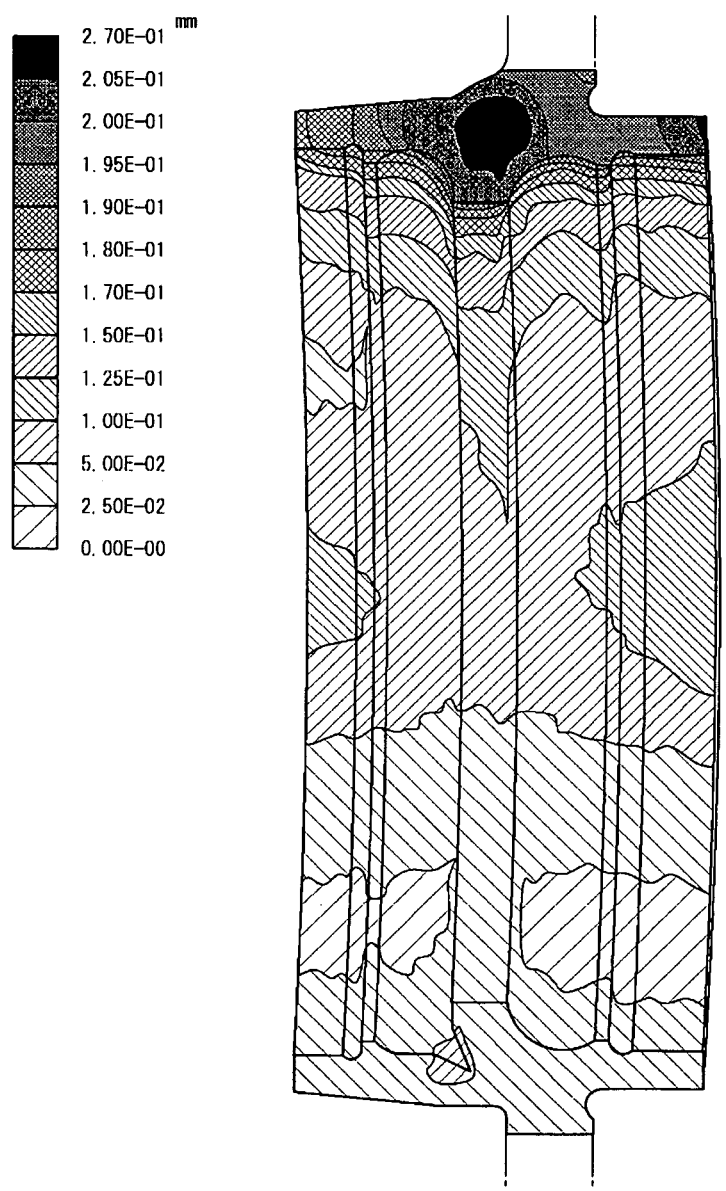
FIG. 7 is a drawing showing the results of an FEM analysis of a displacement of an outer race member of an example of the invention.
Figure 8:
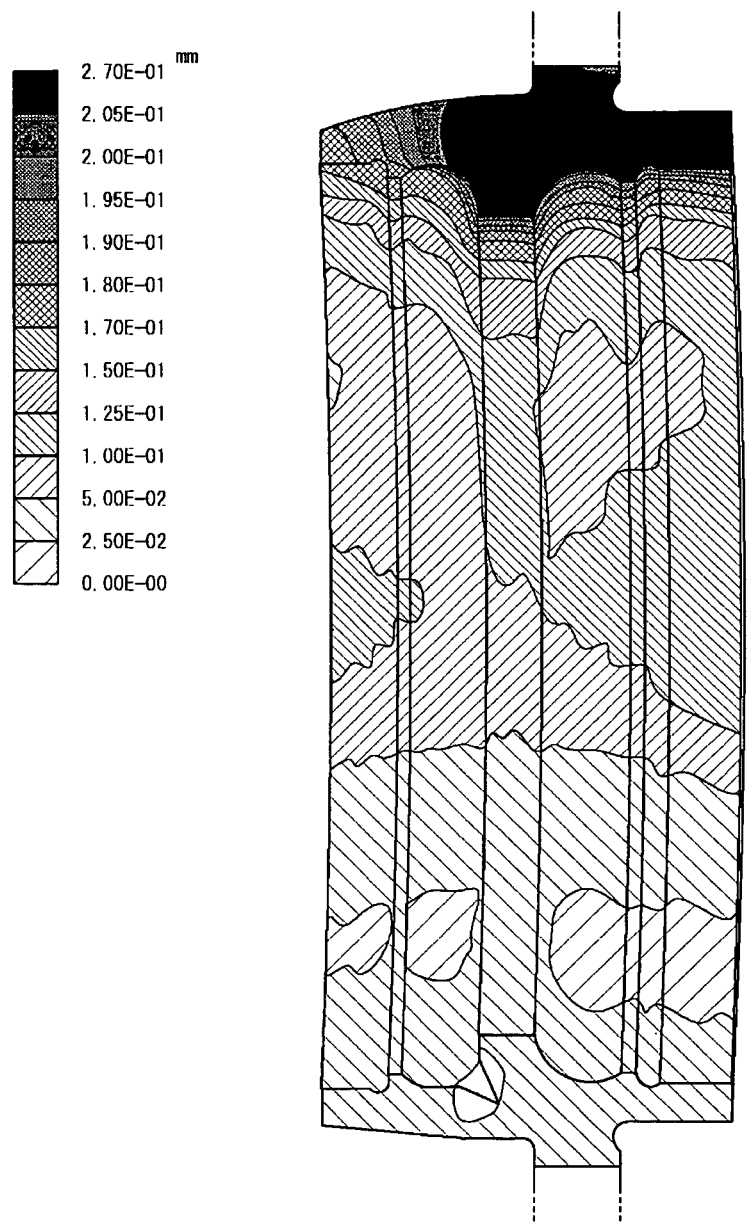
FIG. 8 is a drawing showing the results of an FEM analysis of a displacement of an outer race member of a comparative example.
Figure 9:
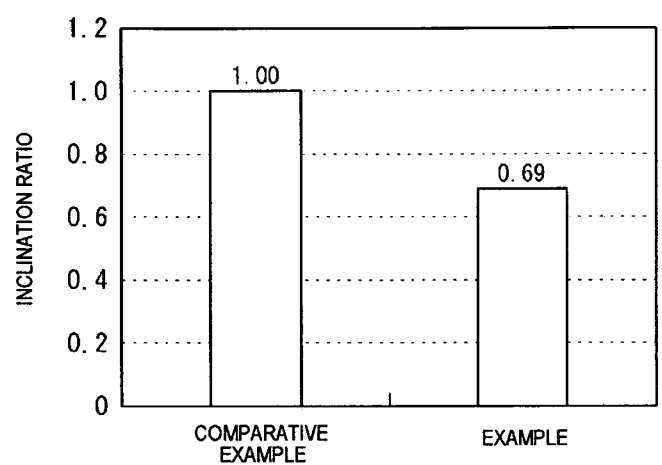
FIG. 9 is a chart showing a comparative between inclination angles of the outer race members of the example of the invention and the comparative example.

In FIGS. 7 and 8, as is obvious from the fact that a region (a portion painted black in the figure) indicated by a range from 2.05E-01 mm to 2.07-01 mm where the displacement is the largest gets quite narrower than that of the comparative example, it is seen that the displacement of the outer race member of the example due to the moment load is smaller than that of the outer race member of the comparative example and that the rigidity of the proximal end portion of the first flange portion of the example is higher than that of the comparative example. In addition, as is obvious from FIG. 9 which shows a ratio of the inclination angle of the outer race member of the comparative member to the inclination angle of the outer race member of the example is 1.00 to 0.69, it is seen that the rigidity of the proximal end portion of the first flange portion of the example is about 45% higher than that of the comparative example.

DESCRIPTION OF REFERENCE NUMERALS 1 rolling bearing apparatus; 11 outer race member; 11c outer circumferential surface; 12 inner race member; 13 ball (rolling element); 21 first flange portion; 22 second flange portion; 25 bolt hole; 26 first reinforcement portion; 26c upper surface; 27 second reinforcement portion

The invention claimed is:

1. A wheel rolling bearing apparatus comprising:
an outer race member which comprises a first flange portion including a bolt hole and a second flange portion including a bolt hole which are projected on an upper portion side and a lower portion side, respectively, and which is attached to a vehicle side via the first and second flange portions;
an inner race member which is disposed inwards of an inner circumference of the outer race member and to which a wheel is attached;
a plurality of rolling elements which are interposed between the outer race member and the inner race member;
a first reinforcement portion which is projected on at least a proximal end portion of the first flange portion to reinforce the proximal end portion by connecting the proximal end portion with an outer circumferential surface of the outer race member, the first reinforcement portion lies on both sides of the bolt hole,
wherein an upper surface, which connects the proximal end portion of the first flange portion with the outer circumferential surface of the outer race member, of the first reinforcement portion comprises a convex curve in an axial section of the outer race member, and
wherein a boundary between the first reinforcement portion and the first flange portion extends at a radially inner side of a radially inner most part of the bolt hole.

2. The wheel rolling bearing apparatus as set forth in claim 1, further comprising:
a second reinforcement portion which is projected on a proximal end portion of the second flange portion to reinforce the proximal end portion by connecting the proximal end portion with the outer circumferential surface of the outer race member,
wherein the proximal end portion of the second flange portion and the second reinforcement portion are provided to extend along a full circumferential length of a region where a load is applied to the second flange portion from the rolling elements.

3. The wheel rolling bearing apparatus as set forth in claim 2, wherein the second reinforcement portion comprises a concave curve in an axial section of the second reinforcement portion.

4. The wheel rolling bearing apparatus as set forth in claim 2, wherein a circumferential width of the proximal end portion of the second flange portion is greater than a circumferential width of the proximal end portion of the first flange portion.

5. The wheel rolling bearing apparatus as set forth in claim 1, further comprising:
a second reinforcement portion which is projected on a proximal end portion of the second flange portion to reinforce the proximal end portion by connecting the proximal end portion with the outer circumferential surface of the outer race member,
wherein the second reinforcement portion comprises a concave curve in an axial section of the second reinforcement portion.

6. The wheel rolling bearing apparatus as set forth in claim 1, wherein the first reinforcement portion includes a pair of rib portions which extend toward a distal end side of the first flange portion as far as a pitch circle which passes through a center of the bolt hole of the first flange portion.

7. The wheel rolling bearing apparatus as set forth in claim 6, wherein the first reinforcement portion includes an inter-rib portion arranged between the pair of rib portions.

8. The wheel rolling bearing apparatus as set forth in claim 7, wherein the inter-rib portion comprises a curved surface such that a curvature of the inter-rib portion decreases towards a circumferential center of the inter-rib portion.

\* \* \* \* \*